July 18, 1967 B. H. TONGUE 3,332,022
TUNNEL DIODE CONVERTER SYSTEM
Filed Oct. 21, 1963
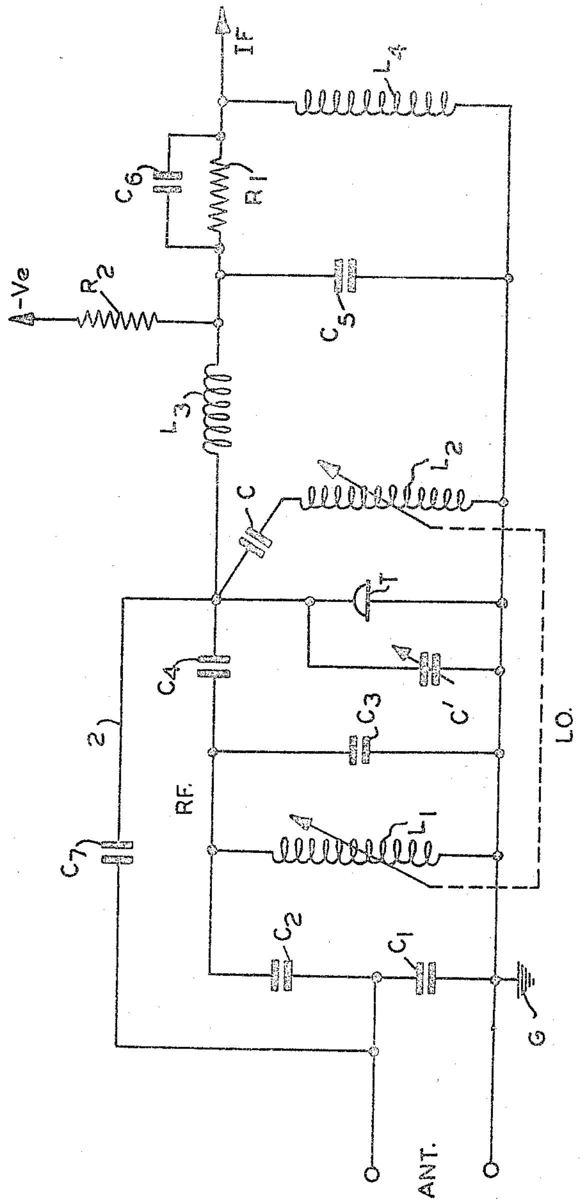
INVENTOR
BEN H. TONGUE
BY Rines and Rines
ATTORNEYS

United States Patent Office 3,332,022
Patented July 18, 1967

3,332,022

TUNNEL DIODE CONVERTER SYSTEM

Ben H. Tongue, West Orange, N.J., assignor to Blonder-Tongue Electronics, Newark, N.J., a corporation of New Jersey Filed Oct. 21, 1963, Ser. No. 317,530
4 Claims. (Cl. 325—449)

The present invention relates to converter systems and, more specifically, to radio-frequency converters embodying semi-conductor devices, such as tunnel diodes and the like, as self-oscillating mixer devices.

Serious difficulties with converters employing self-oscillating mixer devices comprising negative-resistance semi-conductor elements, such as tunnel diodes, arise when the antenna or other radio-frequency signal-receiving-and-applying circuit becomes mis-matched to the radio-frequency circuit at the local oscillator frequency. In ultra-high-frequency television converters, this result can readily occur in off-channel tuning and under other conditions. The reactance of such mis-match cooperatively tunes with the radio-frequency circuit to place a zero across, or otherwise detrimentally affect, the local oscillator circuit comprising the self-oscillating tunnel diode. This is particularly troublesome where tunnel diodes are employed since there may not be enough radio-frequency selectivity in such circuits between the antenna and the tunnel diode to present enough attenuation to isolate the antenna mis-match from the local oscillator circuit. In addition, such circuits suffer from the further difficulty that local oscillation frequency energy rather readily feeds back to the antenna and radiates undesired interference. While isolating and buffer circuits can be employed to minimize these effects, they add complexity and cost to the converter.

An object of the invention, accordingly, is to provide a new and improved converter circuit of the character described, that, despite the use of self-oscillating tunnel diodes and the like, provides inherent isolation of antenna mis-match from the local oscillator circuit and prevents oscillator energy feeding back to produce interference radiation.

A further object is to provide a novel radio-frequency conversion system of more general utility, also.

Other and further objects will be explained hereinafter and will be more particularly delineated in the appended claims. In summary, however, through appropriate selective coupling of the tunnel diode or similar self-oscillating mixer element to the radio-frequency network and to the local oscillator tuned circuit, and by the use of a critical appropriate auxiliary neutralizing feedback circuit, the above-described difficulties are remarkably overcome and without resort to supplemental isolation, buffer or trap circuits and the like. Preferred constructional details are hereinafter set forth.

The invention will now be described in connection with the accompanying drawing the single figure of which is a schematic circuit diagram of a preferred embodiment thereof.

Referring to the drawing, an antenna ANT. or similar signal-applying means (such as, for example, an ultra-high-frequency band television receiving antenna), applies signals across a capacitance $C_1$ forming part of a tap-down input capacitance network $C_1$, $C_2$. The network $C_1$, $C_2$ is connected across the input radio-frequency network RF of the converter, comprising variable inductance $L_1$ and shunt capacitance $C_3$, tunable over the range of the desired band. This input radio-frequency signal, after reception in the network RF, is coupled relatively loosely by small coupling capacitance $C_4$ to the upper terminal of a tunnel diode T or similar negative-resistance device that is to serve, for example, both as a mixer and as the negative-resistance element of a local oscillator circuit in the illustrated embodiment. The inductance $L_2$, synchronously tunable with the RF circuit inductance $L_1$, as schematically illustrated by the dotted gang connection therebetween, cooperates with the tunnel diode element T and its variable shunt trimmer capacitance C′ to generate, as the local oscillator LO, the local oscillation frequency, preferably below the signal received in the RF network; the local oscillator thus tracking with the tuning of the RF network to maintain a predetermined fixed intermediate frequency as a result of simultaneous mixing in the self-oscillating element T. It is desired to insure oscillation of the mixer element T at the desired local oscillator circuit frequency instead of at the RF frequency, with the network RF inherently presenting a net reactance at the local oscillator frequency that acts as an attentuator and isolates resistive effects of the self-applying system ANT. from the local oscillator circuit LO when the system ANT. is matched to the input circuit RF. This end is accomplished by adjusting the coupling capacitance C between the local oscillator tuning coil $L_2$ and the upper terminal of the tunnel diode element T to have a relatively high value in order to provide tight coupling compared to that provided by coupling capacitance $C_4$.

The reuslting intermediate frequency at the mixer element T is fed through a radio-frequency choke $L_3$ and and RC coupling circuit $R_1$, $C_6$, to the intermediate-frequency stages IF, the choke being by-passed for the local oscillator frequency by shunt capacitance $C_5$. Operating bias voltage for the element T is provided from a negative supply terminal $-ve$ through resistance $R_2$ and choke $L_3$, the lower terminal of the element T being grounded at G. A direct-current choke return is provided, also, at $L_4$, elements $R_2$, $R_1$ and $L_4$ serving as the tunnel diode bias supply voltage divider.

Further in accordance with the invention, any reactive effect of mis-matching of ANT. to the network RF is prevented from resonating with the network RF at a frequency at or near the local oscillator frequency that would deleteriously alter the local oscillator frequency and produce the other difficulties above mentioned. This is accomplished by a critically adjusted auxiliary neutralizing feedback path 2, connected from the upper terminal of the element T to the upper antenna or input terminal, containing a capacitance $C_7$. The capacitance $C_7$ must have a critical value to effect this result; namely, a value such that the current fed back is substantially equal to but out-of-phase with the current passing through the network RF, between the antenna ANT. and the element T. Under such circumstances, it has been found that the isolation and interference-preventing effects previously described may be produced.

As an illustration, for the ultra-high-frequency television band, the following values of parameters have been found to produce these novel results with the net reactance of the RF network at mis-match being inductive and the auxiliary neutralizing feedback circuit 2 being capacitive:

| | |
|---|---|
| $C_2$ | 4.7 $\mu\mu$f. |
| $C_1$ | 0.68 $\mu\mu$f. |
| $L_1$ and net shunt capacitance | 470 to 890 mc./s. |
| $L_2$ and net shunt capacitance including that of T | 388 to 808 mc./s. |
| $C_4$ | 0.47 $\mu\mu$f. |
| C | 8.2 $\mu\mu$f. |
| $C_5$ | 6.8 $\mu\mu$f. |
| $R_2$ | 390 ohms. |
| $R_1$ | 56 ohms. |
| $C_6$ | 26 $\mu\mu$f. |
| T | General Electric type TD–1 tunnel diode. |
| $C_7$ | 0.56 $\mu\mu$f. |
| IF | 82 mc./s. |

Modifications will occur to those skilled in the art and all such are considered to fall within the spirit and scope of the invention as defined in the appended claims.

What is claimed is:

1. In a converter system, a tunable radio-frequency network, means for applying a band of radio-frequency signals to the network within the tuning range thereof, a local oscillator circuit tunable synchronously with the radio-frequency network to local oscillator frequencies differing by a fixed intermediate frequency from the frequency to which the radio-frequency network is tuned, a mixer element connected to a point relatively loosely coupled to the radio-frequency network and relatively tightly coupled to the local oscillator circuit and serving also as a negative-resistance element of the local oscillator circuit to insure oscillation through the mixer element at the local oscillator circuit frequency with the radio-frequency network at a frequency at or near the said local oscillator frequency and acting as a reactive attenuator that isolates resistive effects of the signal-applying means from the local oscillator circuit, and means for preventing the presence of reactive effects of the signal-applying means during mis-matching of the same to the radio-frequency network from resonating with the radio-frequency network at a frequency at or near the said local oscillator frequency and thereby altering the oscillating frequency of the oscillator circuit comprising an auxiliary neutralizing circuit connected between the applying means and the said point of loosely and tightly coupled connection of the mixer element to feedback from the mixer element to the applying means a current substantially equal to but out-of-phase with the current passing through the radio-frequency network between the mixer element and the signal-applying means at the oscillator frequency.

2. A system as claimed in claim 1 and in which the mixer is a self-oscillating negative-resistance shunt-capacitance device.

3. A system as claimed in claim 2 and in which the negative-resistance device is a tunnel diode.

4. A system as claimed in claim 1 and in which the local oscillator is tuned below the radio-frequency network, the said radio-frequency net reactance is inductive, and the said auxiliary neutralizing circuit is capacitive.

References Cited

UNITED STATES PATENTS

| | | | |
|---|---|---|---|
| 2,107,395 | 2/1938 | Schlesinger | 325—436 |
| 2,921,189 | 1/1960 | Nash | 325—436 |
| 3,125,725 | 3/1964 | Chang | 325—449 |

KATHLEEN H. CLAFFY, *Primary Examiner.*

R. S. BELL, *Assistant Examiner.*